United States Patent
Serebryany et al.

(10) Patent No.: US 10,846,407 B1
(45) Date of Patent: Nov. 24, 2020

(54) MACHINE LEARNING MODEL ROBUSTNESS CHARACTERIZATION

(71) Applicant: CALYPSO AI CORP, San Mateo, CA (US)

(72) Inventors: Neil Serebryany, San Francisco, CA (US); Brendan Quinlivan, San Francisco, CA (US); Victor Ardulov, Los Angeles, CA (US); Ilja Moisejevs, Dublin (IE); David Richard Gibian, New York, NY (US)

(73) Assignee: CALYPSO AI CORP, San Mateo, CA (US)

( * ) Notice: Subject to any disclaimer, the term of this patent is extended or adjusted under 35 U.S.C. 154(b) by 0 days.

(21) Appl. No.: 16/788,200

(22) Filed: Feb. 11, 2020

(51) Int. Cl.
  *G06F 21/56* (2013.01)
  *G06N 20/00* (2019.01)
  *G06N 7/00* (2006.01)

(52) U.S. Cl.
  CPC .......... *G06F 21/566* (2013.01); *G06N 7/005* (2013.01); *G06N 20/00* (2019.01); *G06F 2221/033* (2013.01)

(58) Field of Classification Search
  CPC .. G06F 21/56; G06F 21/566; G06F 2221/033; G06F 2221/034; G06F 21/561; G06F 21/562; G06N 20/00; G06N 20/10
  See application file for complete search history.

(56) References Cited

U.S. PATENT DOCUMENTS

| | | | | |
|---|---|---|---|---|
| 10,504,035 B2* | 12/2019 | Shteingart | ............ | G06N 20/00 |
| 10,542,034 B1* | 1/2020 | Shintre | ............... | G06F 21/554 |
| 2017/0353481 A1* | 12/2017 | Kong | .................. | H04L 63/145 |
| 2017/0357807 A1* | 12/2017 | Harms | .................. | G06F 21/51 |
| 2018/0189481 A1* | 7/2018 | Liu | ......................... | G06F 21/53 |
| 2019/0080089 A1* | 3/2019 | Chen | ..................... | G06N 20/00 |
| 2019/0215329 A1* | 7/2019 | Levy | ..................... | G06F 21/56 |
| 2019/0244103 A1* | 8/2019 | Wang | ................... | G06N 3/0454 |
| 2019/0273510 A1* | 9/2019 | Elkind | ..................... | G06F 8/74 |
| 2019/0325163 A1* | 10/2019 | Sharad | ............... | G06F 21/6227 |
| 2019/0354688 A1* | 11/2019 | Ding | ...................... | G06F 21/52 |
| 2020/0026996 A1* | 1/2020 | Kolter | ................. | G06N 3/0481 |
| 2020/0053123 A1* | 2/2020 | Pliskin | ................. | G06F 21/566 |
| 2020/0082097 A1* | 3/2020 | Poliakov | .............. | G06F 16/951 |

(Continued)

OTHER PUBLICATIONS

Xu et al., Automatically Evading Classifiers, Feb. 2016, http://dx.doi.org/10.14722/ndss.2016.23115 (Year: 2016).*

(Continued)

*Primary Examiner* — Khang Do

(74) *Attorney, Agent, or Firm* — Jones Day

(57) ABSTRACT

Robustness of a machine learning model can be characterized by receiving a file with a known, first classification by the machine learning model. Thereafter, a selection is made as to which of a plurality of perturbation algorithms to use to modify the file. The perturbation algorithm is selected as to provide a shortest sequence of actions to cause the machine learning model to provide a desired classification. Subsequently, the received file is iteratively modified using the selected perturbation algorithm and inputting the corresponding modified file into the machine learning model until the machine learning model outputs a known, second classification. Related apparatus, systems, techniques and articles are also described.

41 Claims, 5 Drawing Sheets

(56) References Cited

U.S. PATENT DOCUMENTS

| | | | |
|---|---|---|---|
| 2020/0134468 A1* | 4/2020 | Ding | G06K 9/6256 |
| 2020/0159924 A1* | 5/2020 | Tran | G06N 3/088 |
| 2020/0167471 A1* | 5/2020 | Rouhani | G06N 3/0454 |
| 2020/0175176 A1* | 6/2020 | Fischer | G06K 9/6267 |
| 2020/0210575 A1* | 7/2020 | Huang | G06N 3/088 |
| 2020/0293941 A1* | 9/2020 | Bos | H04L 9/0869 |

OTHER PUBLICATIONS

Anderson et al., Evading Machine Learning Malware Detection, Black Hat USA 2017, Jul. 22-27, 2017, Las Vegas, NV, USA (Year: 2017).*

* cited by examiner

MACHINE LEARNING MODEL ROBUSTNESS CHARACTERIZATION

TECHNICAL FIELD

The subject matter described herein relates to advanced techniques for characterizing a level of robustness of a machine learning model.

BACKGROUND

Artificial intelligence (AI) systems are continuously being integrated to solve complex and nonlinear problems across different industries for diverse applications. Many such AI systems incorporate machine learning-based classifiers, the outputs of which, are used to drive various processes and/or decisions. Adversarial machine learning seeks to cause such classifiers to provide inaccurate classifications which, in turn, causes such AI systems to change such processes and/or decisions so that the AI systems malfunction.

SUMMARY

In a first aspect, robustness of a machine learning model can be characterized by receiving a file with a known, first classification by the machine learning model. Thereafter, a selection is made as to which of a plurality of perturbation algorithms to use to modify the file. The perturbation algorithm is selected as to provide a shortest sequence of actions to cause the machine learning model to provide a desired classification. Subsequently, the received file is iteratively modified using the selected perturbation algorithm and inputting the corresponding modified file into the machine learning model until the machine learning model outputs a known, second classification.

The received file can additionally have a known behavior, and in such cases, it can be verified that a behavior of the iteratively modified file with the associated known, second classification matches the known behavior of the received file. The verifying can, in some variations, be performed within a sandbox environment. The received file can comprise malware and the known behavior can include malicious behavior.

The iterative modification of the received file can be continued if the behavior of the iteratively modified file with the associated known, second classification does not match the known behavior of the received file.

The selected perturbation algorithm can selects action to apply in a sequential manner without considering a state of the file or previous actions applied to modify the file.

The selected perturbation algorithm can use one or more of: learned probability, pattern matching (e.g., an Apriori algorithm, etc.), or reinforcement learning.

The iterative modifying can include transmitting a binary of the file, a type for the file, and an action identifier to a perturbation engine. A modified version of the file can be later received from the perturbation engine after an action corresponding to the action identifier has been applied.

The actions can take various forms including modifying bytes of a known variable within the file, expanding or shrinking a size of elements in the file requiring the file to be reconstructed, and/or appending, inserting, or removing bytes from the file without reconstructing the file.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced tools to allow security engineers to ensure that machine learning systems that they are building and/or incorporating into their infrastructure are protected against adversarial machine learning (AML) exploits.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to advanced techniques for assessing the robustness of machine learning models. In particular, the current subject matter is directed to techniques for modifying samples (e.g., .exe files, .dll files, pdf files, etc.) so that they can cause a machine learning model to misclassify the file (which is indicative of a flaw in the model).

Figure 1:
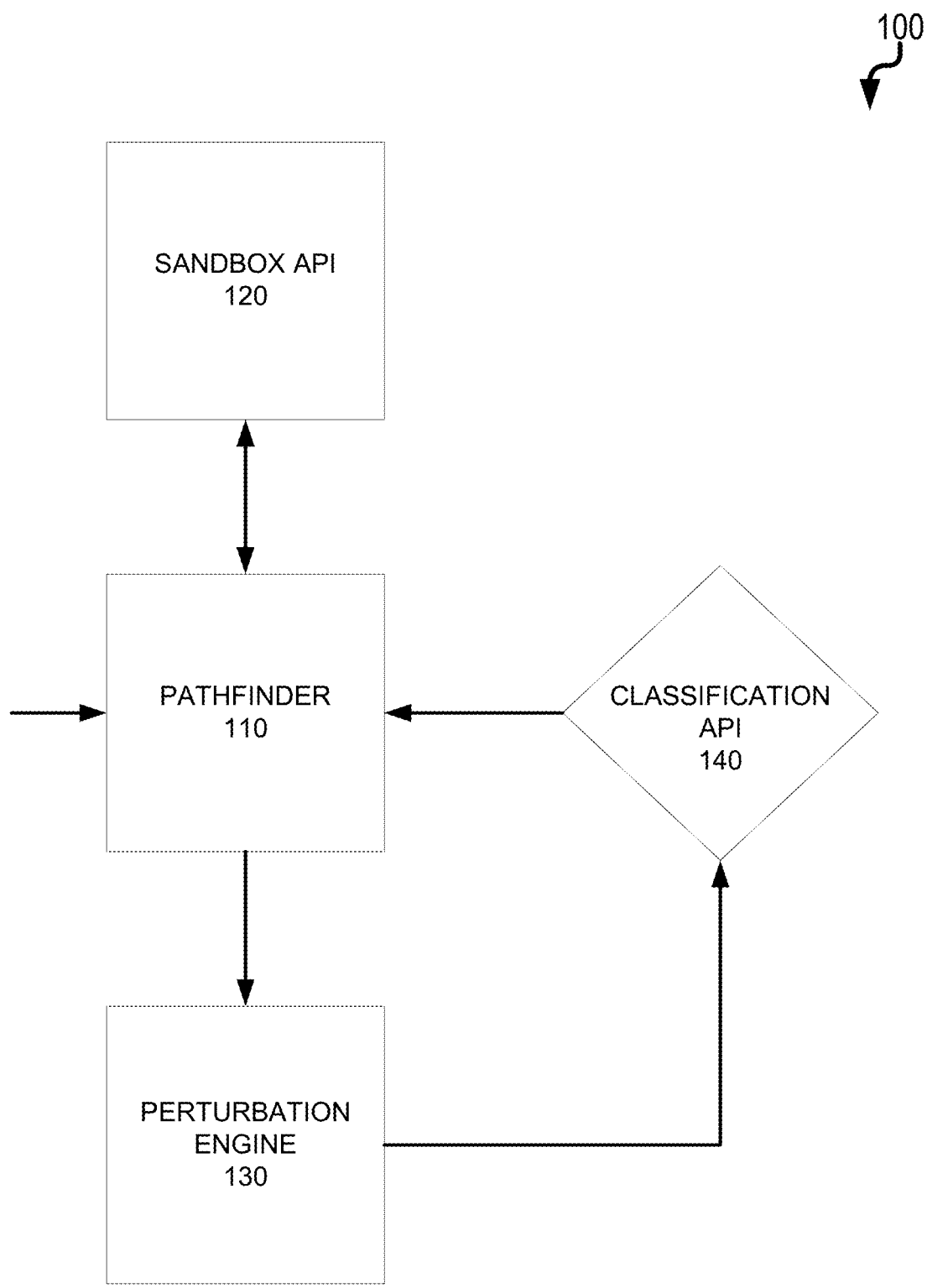
FIG. 1 is a diagram illustrating aspects of a robustness engine.

FIG. 1 is a diagram illustrating four components that can, in some variations, form part of a robustness engine 100. The robustness engine 100 can include a pathfinder 110, a perturbation engine 120, a classifier API 130, and a sandbox API 140. The pathfinder 110, perturbation engine 120 and classifier API 130 form a feedback back loop that iterate as the algorithm attempts to find an evasive sample. When a sample is finally classified as benign by the classifier API 130, the perturbed sample and original samples can be sent to the sandbox API 140 to confirm, for example, whether the malicious functionality in the original sample has not been altered (i.e., the perturbed sample still performs in the same or similar manner as the original sample).

With regard to the application of malware robustness testing, in order to evade the classifier without breaking functionality of a file, the robustness engine 100 can perform a number of functionality preserving actions to the binary code of malware samples. The perturbation engine 120 has a large database of actions that it can select from, these will be discussed in more detail below. These actions are performed one at a time and are either accepted or rejected depending on feedback from the classifier API 130. The goal of pathfinder 110 is to discover the shortest sequence of perturbations that will defeat the classifier API 130. There are two primary motivation to optimize on the number of perturbations performed by the system. First, such an optimization can reduce the processing time required to generate an evasive sample. Second, applying fewer perturbations to the file reduce the chance of negatively affecting its functionality.

Various action selection algorithms can be used by the pathfinder 110. Example types of algorithms, in order of complexity, include random selection, learned probability, pattern matching, reinforcement learning, and the like.

A random selection algorithm, when used in connection with the feedback loop illustrated in FIG. 1, has been proven to be surprisingly successful as an action selection algorithm. A random selection algorithm selects actions without considering the state of the file or previous actions (i.e., the actions are randomly selected, etc.); the action space has a flat probability distribution.

A learned probability algorithm, as with random selection, has no knowledge of state of the file or previous actions, however, in this algorithm the probability distribution is not flat across the action space is defined by the historic performance of different actions. A database of all random actions is maintained, and the average result of each action combination pair is continuously calculated. The selection of each action is then guided by the historical success of all previous actions following that action. This algorithm can reduce the number of times required to generate an evasive sample as well as the total number of actions required.

With pattern matching, an Apriori algorithm can be trained using results that have been the most successful in the past. The goal here is to find a set of common sequences of actions that tend to defeat a certain classifier and then apply these sequences to unseen samples. In particular, the pattern matching algorithm mines frequent sequences for generating Boolean association rules. The algorithm can use an iterative level-wise search technique to discover (k+1) sequences from k sequences. First, the database is scanned to identify all the frequent 1-sequence by counting each of them and capturing those that satisfy the minimum support threshold. The identification of each frequent itemset requires scanning the entire database until no more frequent k-itemsets are discoverable. The database that is used for training this algorithm is derived from applying the random selection algorithm outlined above a dataset of over 50,000 malware samples against a target classifier. Boolean association rules that are generated can then be deployed against this model for previously unseen malware samples.

Reinforcement learning (RL) as used herein is a machine learning method that trains an agent to take actions in an environment so as to maximize a well-defined reward function. In some examples, the environment can be a feature representation of the malware samples and the action space is the actions available in the perturbation engine. The agent is positively reinforced for finding actions that significantly reduce the file's classification score. For feature sets which are countably infinite (section names, imported function names, etc.), we use hashing to collapse into them into a vector of fixed size.

The training process can be comprised of a number of rounds. Each round begins with a known malware sample that has been correctly identified as malicious by the ML system. This sample is then modified through a series of mutations in the round. Each training round can run for 100 turns, if the agent defeats the classifier early the round is ended. New rounds are run until the agent reaches a steady state, the number of rounds required is not well defined but seems to be proportional the ML model that the agent is exposed to. In practice, it has been observed that an agent may take anywhere from 10,000 to 1,000,000 rounds of training to find an approximate local minimum.

Figure 2:
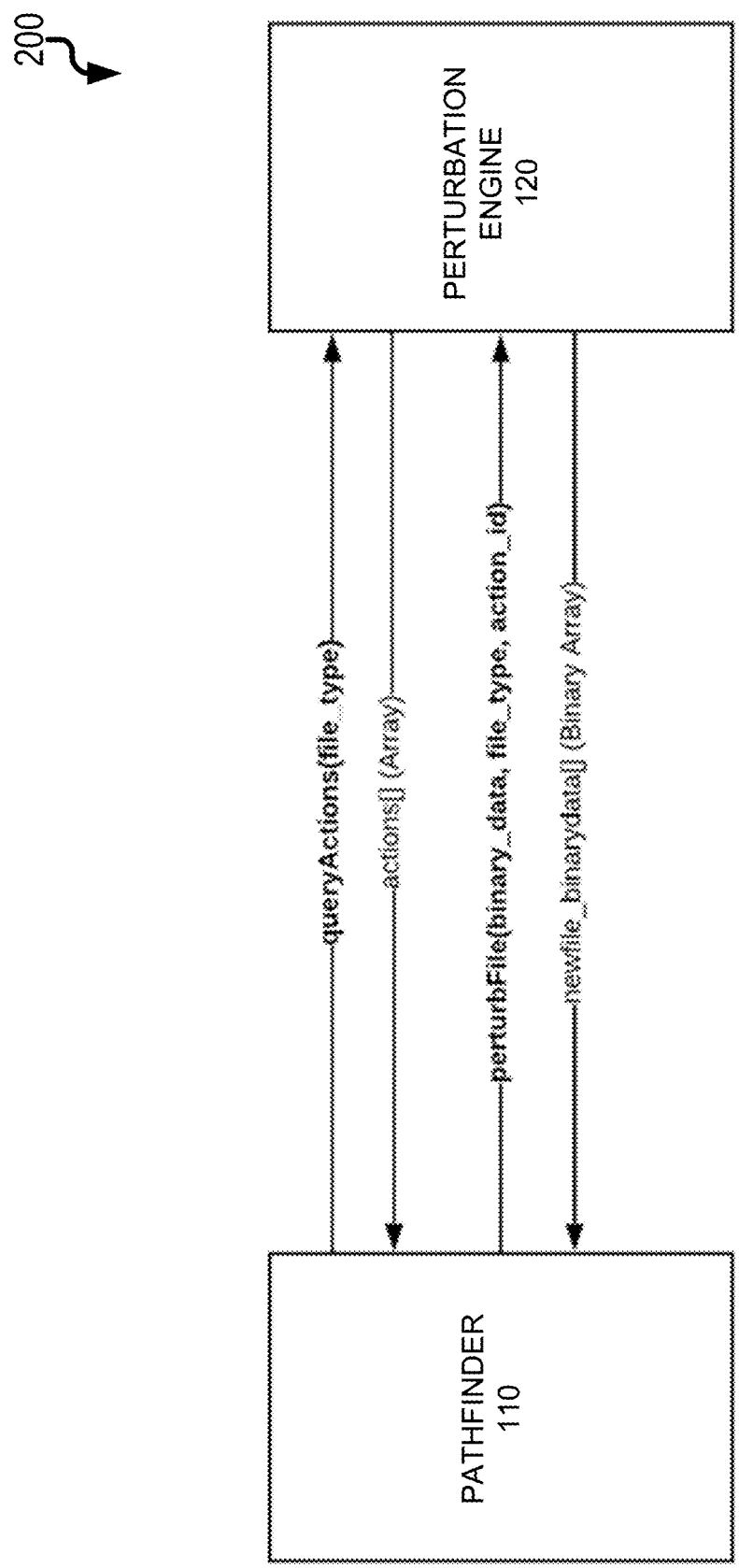
FIG. 2 is a diagram illustrating data exchanged between a pathfinder and a perturbation engine.

The perturbation engine 120 gives the ability to apply actions to a file, that ultimately results in a different classification score. With reference to diagram 200 of FIG. 2, the pathfinder 110 can query the perturbation engine 120 to determine which perturbation actions are available for a certain file type. Subsequently, the perturbation engine 120 can receive the binary data of the file, its type, and an action identifier as input. The perturbation engine 120 can then return the binary data of the new file with the selected action applied to the pathfinder 110.

The perturbation engine 110 can include a different set of actions for each file type/format. The actions available are designed to have a high probability of affecting the feature vector of the malware, while preserving its original malicious functionality. To achieve its goal of keeping the file intact, the perturbation engine 120 can strictly follow the specification of the chosen format. Example modifications types including the following:

Value Modification—

Directly modify the bytes of a known variable according to its specifications. The value can either be modifiable (timestamp), increasable (size of section) or decreasable (OS version).

File Reconstruction—

Modify, expand or shrink different elements of the file, which requires it to be reconstructed (e.g., adding a new section to a PE file or adding an import), etc.

Binary Insertion—

Append, insert or remove bytes without entirely reconstructing the file (e.g., appending binary data at the end of a file, etc.).

In order to evade behavioral as well as static classifiers, actions can also add new behavior to the process—such as modifying a PE file to open a pop-up, or forcing the process to produce additional network traffic.

The classification API 130 gives the robustness engine access to a number of classifiers including, for example, open source and commercial grade classifiers. If a user wishes to generate a sample that will evade a particular antivirus system they can specify this via the classification API 130. The classification API 130 can take a byte steam representation of a malware sample and return a classification score (e.g., a continuous score, a Boolean score, etc.) for the selected malware detection engine. This classification score can then be returned to the pathfinder 110 module and can be employed as a feedback mechanism as part of the overall system.

When an evasive sample has been found (i.e., the classification API 130 returns a benign result), the system has the ability to carry out an automated check to confirm the file is still fully functional. In order to return a conclusive result, the original and perturbed file need to be run in a sandbox for up to 10 minutes. This check therefore adds significant overhead to the generation of evasive samples, for this reason we have made this an optional functionality.

Figure 3:
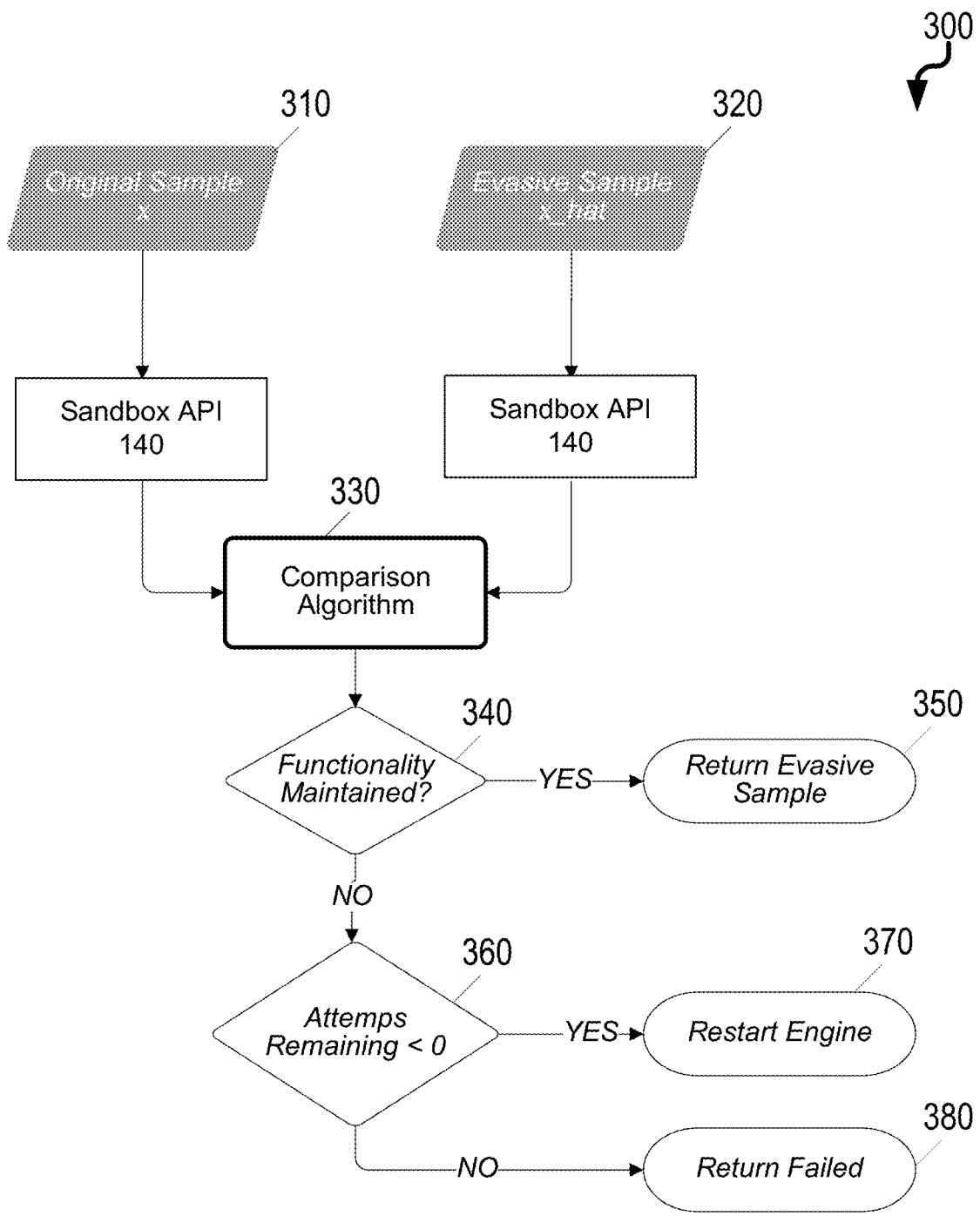
FIG. 3 is a diagram illustrating a process for confirming whether functionality of a sample is maintained after perturbation.

FIG. 3 is a process flow diagram 300 illustrating the automatic determination if the functionality of a file has been maintained following perturbation by the perturbation engine 110. If the functionality has not been maintained the, sandbox API 140 can restart the full process. In particular, in FIG. 3, the original sample 310 and the perturbed sample 320 are submitted to two identical snapshots of the sandbox API 140 which, for example, can each be a virtual machine (VM) running the same logging and monitoring systems. These VMs each provide a report of network traffic, system calls, memory alterations and API calls. The two sets of logs are then submitted a comparison algorithm 330 which determines if the files functionality has been maintained 340. If the desired functionality has been maintained, then the evasive sample can be returned 350. If the desired functionality has not been maintained, then iterations can be performed 360 in which the perturbation engine 120 is restarted 370 until such time that a properly functioning evasive sample can be returned 350 or the process stopped 380 (i.e., the process has failed). With regard to the iterations, users can specify how many times they would like robustness engine to attempt to find an evasive sample. As shown in FIG. 3, if an evasive sample submitted to the sandbox API 140 fails, it can be automatically resubmitted to the perturbation engine 120 if it has greater than zero attempts remaining.

As an example, the robustness engine of FIG. 1 was applied against a malware classifier using machine learning to detect previously unseen malware samples. Several categories of malware were selected to test against the classifier including Trojan, Rootkit, Keylogger, Ransomware, Spyware and Adware. In total, approximately 100,000 samples (0.75:0.25, malicious:benign) were selected from a malware database.

This dataset was first employed to in its original form to get a baseline measurement of the performance of the classifier under non-adversarial conditions. Each of the samples was then submitted to the robustness engine and using the classifier, an adversarial example was generated for each one. First, it was seen that the raw classification score of the classifier under adversarial and non-adversarial conditions.

Considering the classification score gives a good representation of the effects of robustness on the classifier at a high level, however, in order to determine the actual effects on the overall system, it was determined to apply a classification threshold to assess the effect in terms of standard classification metrics. For this experiment, a classification score of 0.25 was selected such that any score greater than 0.25 will be classified as malicious by the system. With the experiment, a significant decrease in classification ability of the algorithm using the robustness engine. Precision is the only metric that remained high as the current subject matter as applied to the experiment did not alter the model's ability to detect benign files under the current assessment, and so the model is still correctly classifying benign files as benign, resulting in reasonably high precision.

Figure 4:
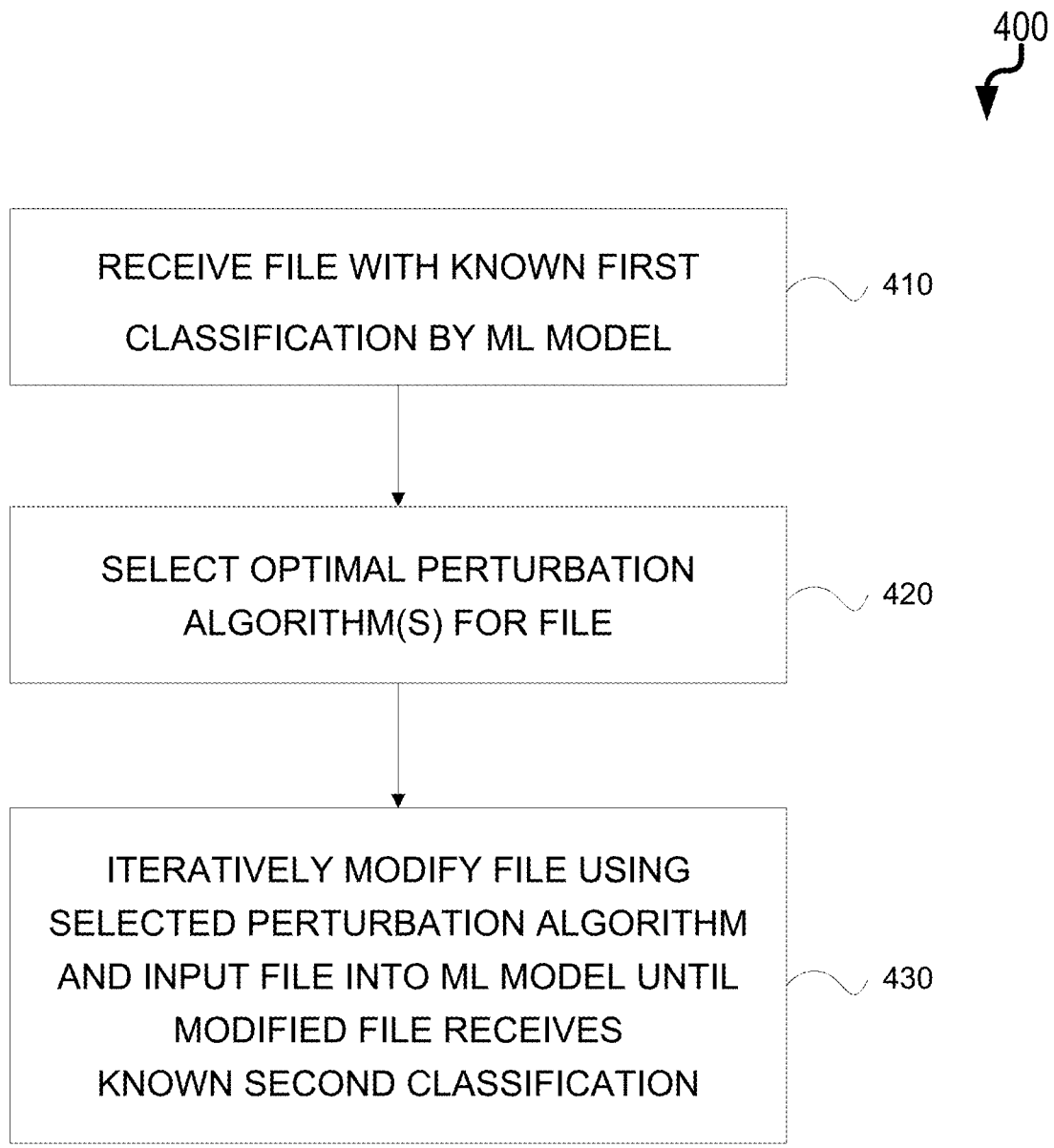
FIG. 4 is a process flow diagram illustrating techniques for characterizing robustness of a machine learning model.

FIG. 4 is a process flow diagram 400 for characterizing a robustness of a machine learning model in which, at 410, a file is received with a known, first classification by the machine learning model. Thereafter, at 420, one or more perturbation algorithms are selected which can be used to modify the file. The perturbation algorithm can be selected as to provide a shortest sequence of actions to cause the machine learning model to provide a desired classification. Later, at 430, the received file is iteratively modified using the selected perturbation algorithm. As part of such iterations, the modified files are input into the machine learning model until the machine learning model outputs a known, second classification.

Figure 5:
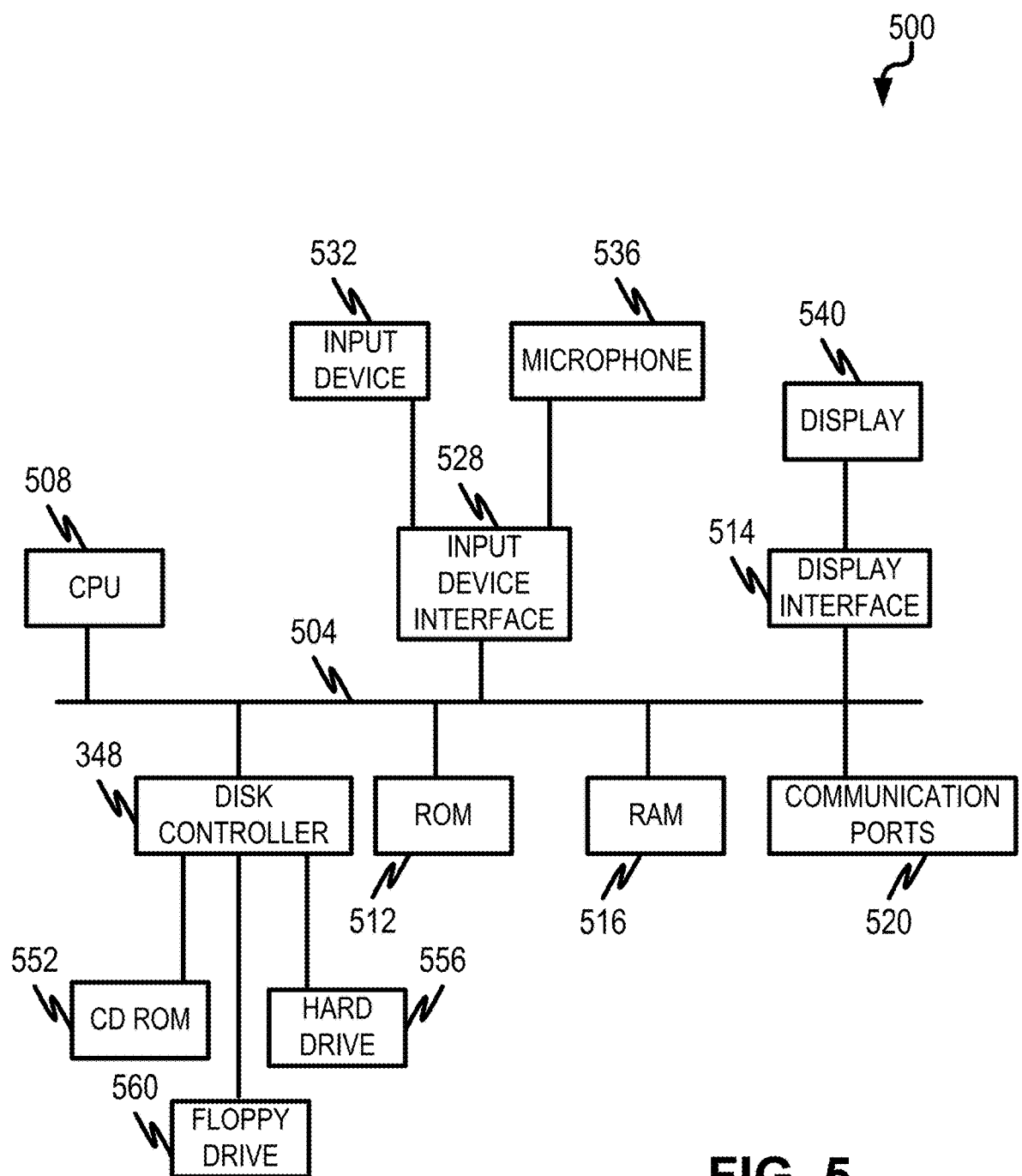
FIG. 5 is a diagram illustrating a computing device for implementing aspects of the current subject matter.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for characterizing a robustness of a machine learning model, the method comprising:
   receiving a file with a known, first classification by the machine learning model;
   selecting which of a plurality of perturbation algorithms to use to modify the file, the perturbation algorithm being selected as to provide a shortest sequence of actions to cause the machine learning model to provide a desired classification; and
   iteratively modifying the received file using the selected perturbation algorithm and inputting the corresponding modified file into the machine learning model until the machine learning model outputs a known, second classification.

2. The method of claim 1, wherein the received file additionally has a known behavior, and wherein the method further comprises:
   verifying that a behavior of the iteratively modified file with the associated known, second classification matches the known behavior of the received file.

3. The method of claim 2, wherein the verifying is performed within a sandbox environment.

4. The method of claim 3, wherein the received file comprises malware and the known behavior comprises malicious behavior.

5. The method of claim 4 further comprising:
   continuing the iterative modification of the received file if the behavior of the iteratively modified file with the associated known, second classification does not match the known behavior of the received file.

6. The method of claim 1, wherein the selected perturbation algorithm selects actions to apply in a sequential manner without considering a state of the file or previous actions applied to modify the file.

7. The method of claim 1, wherein the selected perturbation algorithm uses learned probability.

8. The method of claim 1, wherein the selected perturbation algorithm uses pattern matching.

9. The method of claim 8, wherein the pattern matching uses an Apriori algorithm.

10. The method of claim 1, wherein the selected perturbation algorithm uses reinforcement learning.

11. The method of claim 1, wherein the iteratively modifying comprises:
    transmitting a binary of the file, a type for the file, and an action identifier to a perturbation engine; and
    receiving, from the perturbation engine, a modified version of the file after an action corresponding to the action identifier has been applied.

12. The method of claim 1, wherein the actions comprise modifying bytes of a known variable within the file.

13. The method of claim 1, wherein the actions comprise expanding or shrinking a size of elements in the file requiring the file to be reconstructed.

14. The method of claim 1, wherein the actions comprise appending, inserting, or removing bytes from the file without reconstructing the file.

15. A system for characterizing a robustness of a machine learning model comprising:
   at least one data processor; and
   memory including instructions, which when executed by the at least one data processor, result in operations comprising:
      receiving a file with a known, first classification by the machine learning model;
      selecting which of a plurality of perturbation algorithms to use to modify the file, the perturbation algorithm being selected as to provide a shortest sequence of actions to cause the machine learning model to provide a desired classification; and
      iteratively modifying the received file using the selected perturbation algorithm and inputting the corresponding modified file into the machine learning model until the machine learning model outputs a known, second classification.

16. The system of claim 15, wherein the received file additionally has a known behavior, and wherein the operations further comprise:
   verifying, within a sandbox environment, that a behavior of the iteratively modified file with the associated known, second classification matches the known behavior of the received file.

17. The system of claim 16, wherein the received file comprises malware and the known behavior comprises malicious behavior.

18. The system of claim 16, wherein the operations further comprise:
   continuing the iterative modification of the received file if the behavior of the iteratively modified file with the associated known, second classification does not match the known behavior of the received file.

19. The system of claim 15, wherein the iteratively modifying comprises:
   transmitting a binary of the file, a type for the file, and an action identifier to a perturbation engine; and
   receiving, from the perturbation engine, a modified version of the file after an action corresponding to the action identifier has been applied.

20. The system of claim 15, wherein the selected perturbation algorithm selects actions to apply in a sequential manner without considering a state of the file or previous actions applied to modify the file.

21. The system of claim 15, wherein the selected perturbation algorithm uses learned probability.

22. The system of claim 15, wherein the selected perturbation algorithm uses pattern matching.

23. The system of claim 22, wherein the pattern matching uses an Apriori algorithm.

24. The system of claim 15, wherein the selected perturbation algorithm uses reinforcement learning.

25. The system of claim 15, wherein the actions comprise modifying bytes of a known variable within the file.

26. The system of claim 15, wherein the actions comprise expanding or shrinking a size of elements in the file requiring the file to be reconstructed.

27. The system of claim 15, wherein the actions comprise appending, inserting, or removing bytes from the file without reconstructing the file.

28. A computer-implemented method characterizing a robustness of a machine learning model comprising:
   receiving a file with a known, first classification by the machine learning model;
   selecting which of a plurality of perturbation algorithms to use to modify the file, the perturbation algorithm being selected as to provide a shortest sequence of actions to cause the machine learning model to provide a desired classification;
   iteratively modifying the received file using the selected perturbation algorithm and inputting the corresponding modified file into the machine learning model until the machine learning model outputs a known, second classification; and
   continuing the iterative modification of the received file if behavior of the iteratively modified file with the associated known, second classification does not match a known behavior of the received file.

29. A non-transitory computer readable media comprising instructions, which when executed by at least one computing device, result in operations comprising:
   receiving a file with a known, first classification by the machine learning model;
   selecting which of a plurality of perturbation algorithms to use to modify the file, the perturbation algorithm being selected as to provide a shortest sequence of actions to cause the machine learning model to provide a desired classification; and
   iteratively modifying the received file using the selected perturbation algorithm and inputting the corresponding modified file into the machine learning model until the machine learning model outputs a known, second classification.

30. The non-transitory computer readable media of claim 29, wherein the received file additionally has a known behavior, and wherein the operations further comprise:
   verifying, within a sandbox environment, that a behavior of the iteratively modified file with the associated known, second classification matches the known behavior of the received file.

31. The non-transitory computer readable media of claim 29, wherein the received file comprises malware and the known behavior comprises malicious behavior.

32. The non-transitory computer readable media of claim 29, wherein the operations further comprise:
   continuing the iterative modification of the received file if the behavior of the iteratively modified file with the associated known, second classification does not match the known behavior of the received file.

33. The non-transitory computer readable media of claim 29, wherein the iteratively modifying comprises:
   transmitting a binary of the file, a type for the file, and an action identifier to a perturbation engine; and
   receiving, from the perturbation engine, a modified version of the file after an action corresponding to the action identifier has been applied.

34. The non-transitory computer readable media of claim 29, wherein the selected perturbation algorithm selects actions to apply in a sequential manner without considering a state of the file or previous actions applied to modify the file.

35. The non-transitory computer readable media of claim 29, wherein the selected perturbation algorithm uses learned probability.

36. The non-transitory computer readable media of claim 29, wherein the selected perturbation algorithm uses pattern matching.

37. The non-transitory computer readable media of claim 36, wherein the pattern matching uses an Apriori algorithm.

38. The non-transitory computer readable media of claim 29, wherein the selected perturbation algorithm uses reinforcement learning.

39. The non-transitory computer readable media of claim 29, wherein the actions comprise modifying bytes of a known variable within the file.

40. The non-transitory computer readable media of claim 29, wherein the actions comprise expanding or shrinking a size of elements in the file requiring the file to be reconstructed.

41. The non-transitory computer readable media of claim 29, wherein the actions comprise appending, inserting, or removing bytes from the file without reconstructing the file.

\* \* \* \* \*